United States Patent Office 2,898,339
Patented Aug. 4, 1959

2,898,339

N-SUBSTITUTED BENZHYDROL, BENZHYDRYL, AND BENZHYDRYLIDENE PIPERIDINE

Keith W. Wheeler, Wyoming, and Jay K. Seyler and Frank P. Palopoli, Cincinnati, Ohio, and Frederick J. McCarty, Ann Arbor, Mich., assignors to The Wm. S. Merrell Company No Drawing. Application July 29, 1957
Serial No. 674,601

6 Claims. (Cl. 260—293.4)

Our invention relates to certain novel N-substituted benzhydrol, benzhydryl and benzhydrylidene piperidines which are useful as depressants for the central nervous system.

The novel compounds of our invention have the formula

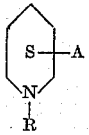

In the formula, S indicates that the ring is saturated. R is an acetyl, trifluoroacetyl, chloroacetyl, carbethoxy, carboxypropionyl, ethoxalyl, carbamyl, ethylcarbamyl, ethylthiocarbamyl, dimethylsulfamyl or N-isonicotinoyl radical. A is a benzhydrol [—COH($C_6H_5$)$_2$], benzhydryl [—CH($C_6H_5$)$_2$] or a benzhydrylidene

[=C($C_6H_5$)$_2$]

radical. In the benzhydrol and benzhydryl compounds A is attached to a piperidine ring carbon atom at the 2 or 4 position. In the benzhydrylidene compounds A is attached to a piperidine ring carbon atom in the 4 position.

The novel 2-and 4-benzhydrolpiperidines, which may also be termed diphenyl-N-substituted piperidine carbinols, have the formula

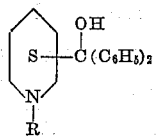

The novel 2- and 4-benzhydrylpiperidines have the formula

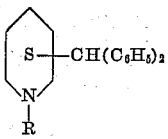

The novel 4-benzhydrylidenepiperidines have the formula

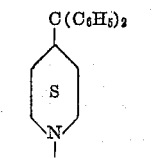

The compounds generally have utility for controlling nervous system disorders, including psychotic and psychoneurotic conditions, e.g. over-activity. All of the compounds exhibit sedative or depressant activity, without any hypnotic activity. Some of the compounds have depressant activity with after effects of stimulant activity. The compounds can be used in oral dosages within the range of about 25 to about 1500 to 2000 mg. daily. Parenterally, dosages within the range of about 25 to about 500 mg. daily can be used. Parenteral administration is preferably by the intramuscular route since most of the compounds are insoluble in water.

The novel compounds are prepared by reacting benzhydrol-, benzhydryl- or benzhydrylidenepiperidine with a compound containing the desired R substituent. An acid acceptor such as triethylamine can be used to accept free acids produced in the reaction.

The novel compounds will be further illustrated by the following examples.

EXAMPLE 1

Diphenyl-4-(N-acetyl)piperidine carbinol

A solution of 14 g. (0.0525 mole) of diphenyl-4-piperidine carbinol (α,α-diphenyl-4-piperidinemethanol as described in Patent No. 2,804,422, filed December 29, 1956, of Schumann et al.) and 5.3 g. (0.0525 mole) triethylamine in 125 ml. chloroform was prepared. To this solution was added dropwise, with stirring, 5.8 g. (0.057 mole) acetic anhydride. The temperature was kept below 35° C. by tap water cooling. After the resulting clear solution had stood at room temperature overnight precipitation had occurred. The crystals were collected, then the filtrate was heated at reflux for 1 hour, diluted with an equal volume of petroleum ether, and chilled. Another crop of crystals was obtained. The two crops were combined, then recrystallized from chloroform and petroleum ether. Yield: 13.4 g. of fine, white needles of diphenyl-4-(N-acetyl)piperidine carbinol, M.P. 197–8° C.

Analysis.—Calcd. for $C_{20}H_{23}O_2N$: C, 77.62; H, 7.49; N, 4.53. Found: C, 77.32; H, 7.43; N, 4.60.

This compound exhibits activity as a depressant for the central nervous system.

EXAMPLE 2

Diphenyl-4-(N-trifluoroacetyl)piperdine carbinol

To a stirred solution of 13 g. (0.0488 mole) diphenyl-4-piperidine carbinol and 5 g. (0.049 mole) triethylamine in 100 ml. dry benzene was added, dropwise, 10.2 g. (0.0488 mole) trifluoroacetic anhydride. The temperature was kept below 25° C. with tap water cooling, during addition, after which the temperature was raised to 50° C. and maintained there for 2 hours. The benzene solution was washed with water, then dried over $MgSO_4$. Removal of the benzene by distillation left an oily residue which was crystallized from a mixture of chloroform and petroleum ether to give 6.4 g. of product, diphenyl-4-(N-trifluoroacetyl)piperidine carbinol, M.P. 141–142.5° C.

Analysis.—Calcd. for $C_{20}H_{20}NO_2F_3$: C, 66.10; H, 5.55; N, 3.85. Found: C, 65.84; H, 5.72; N, 3.87.

This compound exhibits activity as a depressant for the central nervous system.

EXAMPLE 3

Diphenyl-2-(N-trifluoroacetyl)piperidine carbinol

Following the procedure given in Example 2, 10 g. (0.0375 mole) diphenyl-2-piperidine carbinol (α,α-diphenyl-2-piperidinemethanol as described in U.S. Patent 2,624,739 to Werner et al.) 4 g. (0.0395 mole) triethylamine and 8.4 g. (0.04 mole) trifluoroacetic anhydride in 100 ml. dry benzene gave 4.9 g. of product, diphenyl-2-(N-trifluoroacetyl)piperidine carbinol, M.P. 135° C.

Analysis.—Calcd. for $C_{20}H_{20}NO_2F_3$: C, 66.10; H, 5.55; N, 3.85. Found: C, 66.23; H, 5.65; N, 4.10.

This compound exhibits activity as a depressant for the central nervous system.

EXAMPLE 4

N-carbethoxy-α,α-diphenyl-4-piperidine carbinol

Following the procedure given in Example 2, 17.5 g. (0.065 mole) diphenyl-4-piperidine carbinol, 8.7 g. (0.08 mole) ethyl chlorocarbonate and 8 g. (0.08 mole) triethylamine in 100 ml. benzene gave 12 gm. of product, N-carbethoxy-α,α-diphenyl-4-piperidine carbinol, M.P. 160–1° C.

*Analysis.*—Calcd. for $C_{21}H_{25}NO_3$: C, 74.35; H, 7.43. Found: C, 74.60; H, 7.42.

This compound exhibits activity as a depressant for the central nervous system.

EXAMPLE 5

N-carbethoxy-α,α-diphenyl-2-piperidine carbinol

Seven and one-half grams (0.069 mole) ethyl chlorocarbonate was added dropwise to a stirred solution of 37 g. (0.138 mole) diphenyl-2-piperidine carbinol in 100 ml. dry benzene. The temperature was maintained at 70° C. for 3 hours, then the solution cooled. After removal of the precipitated diphenyl-2-piperidine carbinol hydrochloride, by filtration, the filtrate was concentrated. The residue was then crystallized from petroleum ether. Yield: 13 g. of N-carbethoxy-α,α-diphenyl-2-piperidine carbinol, M.P. 133–4° C.

*Analysis.*—Calcd. for $C_{21}H_{25}NO_3$: C, 74.31; H, 7.42; N, 4.13. Found: C, 74.08; H, 7.10; N, 3.81.

This compound exhibits activity as a depressant for the central nervous system.

EXAMPLE 6

N-dimethylsulfamyl-α,α-diphenyl-4-piperidine carbinol

Following the procedure given in Example 2, 20 g. (0.066 mole) diphenyl-4-diperidine carbinol hydrochloride, 14 g. (0.138 mole) triethylamine and 9.6 g. (0.067 mole) dimethylsulfamyl chloride in 300 ml. dry toluene gave 5.5 g. of product, N-dimethylsulfamyl-α,α-diphenyl-4-piperidine carbinol, M.P. 172–4° C.

*Analysis.*—Calcd. for $C_{20}H_{26}N_2O_3S$: C, 64.13; H, 7.00; N, 7.48. Found: C, 64.52; H, 6.96; N, 7.14.

This compound exhibits activity as a depressant for the central nervous system.

EXAMPLE 7

N-chloroacetyl-α,α-diphenyl-4-piperidine carbinol

The procedure given in Example 2 was followed, using 14 g. (0.0525 mole) diphenyl-4-piperidine carbinol, 5.3 g. (0.0525 mole) triethylamine and 6 g. (0.053 mole) chloroacetyl chloride. Obtained 4.4 g. product, N-chloroacetyl-α,α-diphenyl-4-piperidine carbinol, M.P. 154–5° C.

*Analysis.*—Calcd. for $C_{20}H_{22}NO_2Cl$: C, 69.85; H, 6.45; N, 4.07. Found: C, 69.97; H, 6.62; N, 4.09.

This compound exhibits activity as a depressant for the central nervous system.

EXAMPLE 8

N-(β-carboxypropionyl)-α,α-diphenyl-4-piperidine carbinol

Five and one-half grams (0.055 mole) of succinic anhydride was dissolved in 100 ml. of 1,2-dimethoxyethane at slightly above room temperature, then 14.5 g. (0.054 mole) diphenyl-4-piperidine carbinol was added in small portions over a period of 10 minutes. The temperature rose from 31.5° C. to 39° C. This mixture was kept at 60–65° C. for 30 minutes, then allowed to stand at room temperature for 20 hours, then chilled. The first crop of 3.7 g., M.P. 190–200° C. was discarded. The second crop, on concentration of the filtrate, amounted to 10.0 g. of product, M.P. 155–8° C. Recrystalization from chloroform and petroleum ether gave 8.3 g. of product, N-(β-carboxypropionyl)-α,α-diphenyl-4-piperidine carbinol, isolated as the monohydrate, M.P. 172.5–173° C. Neutral equivalent: calcd., 385.4; found, 384.6.

*Analysis.*—Calcd. for $C_{22}H_{25}NO_4 \cdot H_2O$: C, 68.55; H, 7.06; N, 3.63. Found: C, 68.31; H, 6.67; N, 3.70.

This compound exhibits activity as a depressant for the central nervous system.

This compound also forms salts, e.g. the sodium salt which is water soluble.

EXAMPLE 9

N-carbamyl-α,α-diphenyl-4-piperidine carbinol

Fifteen grams (0.05 mole) of diphenyl-4-piperidine carbinol hydrochloride was dissolved in 600 ml. of water at 55° C. The solution was filtered and a solution of 6 g. (0.075 mole) of potassium cyanate in 30 ml. of water was added to the filtrate. An immediate precipitate appeared. Enough acetone, about 200 ml., was added to dissolve the precipitate at 58° C. The solution was allowed to stand at room temperature for 5 hours, then chilled at 0° overnight. Filtration gave 10.7 g. of lustrous white crystals, M.P. 198–200° C. An additional 2.7 g. of product (M.P. 198–200° C.) was obtained by removing the acetone at the water pump. The combined 13.4 g. was recrystallized from chloroform-petroleum ether to give 10.3 g. of product, N-carbamyl-α,α-diphenyl-4-piperidine carbinol, M.P. 200.5–201° C.

*Analysis.*—Calcd. for $C_{19}H_{22}N_2O_2$: C, 73.50; H, 7.15; N, 9.03. Found: C, 73.29; H, 7.23; N, 9.42.

This compound exhibits activity as a depressant for the central nervous system.

EXAMPLE 10

N-carbamyl-α,α-diphenyl-2-piperidine carbinol

Following the procedure given in Example 9, 18.2 g. (0.06 mole) diphenyl-2-piperidine carbinol hydrochloride and 6 g. (0.074 mole) of potassium cyanate in 500 ml. of water gave, finally, 1.5 g. of product, N-carbamyl-α,α-diphenyl-2-piperidine carbinol, M.P. 170–1° C.

*Analysis.*—Calcd. for $C_{19}H_{22}N_2O_2$: C, 73.50; H, 7.15; N, 9.03. Found: C, 73.73; H, 7.20; N, 9.21.

This compound exhibits activity as a depressant for the central nervous system.

EXAMPLE 11

Diphenyl-4-(N-ethylcarbamyl)piperidine carbinol

Seventeen and eight-tenths grams (0.067 mole) diphenyl-4-piperidine carbinol was dissolved in 300 ml. dry benzene at 45° C. Five grams (0.0715 mole) ethyl isocyanate was then added portionwise. Some precipitation occured. The suspension was heated on the steam bath for 2 hours, then chilled in ice. Collection of the precipitate (20.8 g., M.P. 210–14° C.) followed by recrystallization of 10 g. from ethanol-petroleum ether gave 8 g. of product, diphenyl-4-(N-ethylcarbamyl)-piperdine carbinol, M.P. 213–14° C.

*Analysis.*—Calcd. for $C_{21}H_{26}N_2O_2$: C, 74.52; H, 7.75; N, 8.28. Found: C, 74.16; H, 7.81; N, 8.50.

This compound exhibits activity as a depressant for the central nervous system.

EXAMPLE 12

Diphenyl-2-(N-ethylcarbamyl)piperidine carbinol

Following the procedure given in Example 11, 10 g. (0.0375 mole) diphenyl-2-piperidine carbinol and 2.8 g. (0.0395 mole) ethyl isocyanate in 160 ml. dry benzene gave 9.2 g. of product, diphenyl-2-(N-ethylcarbamyl) piperidine carbinol, M.P. 128–9° C.

*Analysis.*—Calcd. for $C_{21}H_{26}N_2O_2$: C, 74.52; H, 7.75; N, 8.28. Found: C, 74.51; H, 7.60; N, 8.18.

This compound exhibits activity as a depressant for the central nervous system.

EXAMPLE 13

*Diphenyl-4-(N-ethylthiocarbamyl)piperidine carbinol*

Following the procedure of Example 11, 10 g. (0.0375 mole) diphenyl-4-piperidine carbinol and 3.5 g. (0.04 mole) ethyl isothiocyanate in 200 ml. dry benzene gave 10.7 g. of product, diphenyl-4-(N-ethylthiocarbamyl)piperidine carbinol, M.P. 176.5–177° C.

*Analysis.*—Calcd. for $C_{21}H_{26}N_2OS$: C, 71.15; H, 7.40; N, 7.90. Found: C, 70.95; H, 7.42; N, 7.75.

This compound exhibits activity as a depressant for the central nervous system.

EXAMPLE 14

*Diphenyl-2-(N-ethylthiocarbamyl)piperidine carbinol*

Following the procedure of Example 11, 15 g. (0.0563 mole) diphenyl-2-piperidine carbinol and 6 g. (0.069 mole) ethyl isothiocyanate in 100 ml. toluene gave 4 g. of product, diphenyl-2-(N-ethylthiocarbamyl)piperidine carbinol, M.P. 136–7° C.

*Analysis.*—Calcd. for $C_{21}H_{26}N_2OS$: C, 71.15; H, 7.40; N, 7.90. Found: C, 70.96; H, 7.64; N, 7.88.

This compound exhibits activity as a depressant for the central nervous system.

EXAMPLE 15

*Diphenyl-4(N-isonicotinoyl)piperidine carbinol*

Following the procedure of Example 1, 14 g. (0.05 mole) diphenyl-4-piperidine carbinol, 5.3 g. (0.05 mole) triethyl amine, and 13 g. (0.057 mole) isonicotinic acid anhydride gave 10 g. of product, diphenyl-4-(N-isonicotinoyl)piperidine carbinol, M.P. 231–3° C.

*Analysis.*—Calcd. for $C_{24}H_{24}N_2O_2$: C, 77.41; H, 6.50; N, 7.52. Found: C, 76.96; H, 6.61; N, 7.61.

This compound exhibits activity as a depressant for the central nervous system.

EXAMPLE 16

*N-acetyl-4-benzhydrylidenepiperidine*

4-benzhydrylidenepiperidine was prepared as follows. A suspension of 100 g. (0.33 mole) of diphenyl-4-piperidine-carbinol hydrochloride in 700 ml. of a 1:1 solution of concentrated sulfuric acid in water was heated on the steam bath, with stirring, for 7 hours. The resulting purple solution was poured over ice and the precipitate which formed was collected. Recrystallization of this material from water gave 95 g. of the sulfate salt of 4-benzhydrylidenepiperidine, M.P. 246–7° C. This was suspended in a mixture of 400 ml. of water containing 22 g. (0.55 mole) sodium hydroxide, and 600 ml. benzene, and the mixture heated on the steam bath, with stirring, until all of the solid had gone into solution. About 1 hour was required. The benzene layer was separated, washed with water, a saturated solution of sodium chloride in water, and dried over magnesium sulfate. Removal of the benzene and crystallization of the residue from petroleum ether (B.P. 70–90°) gave 65.5 g. (80%) of 4-benzhydrylidenepiperidine, M.P. 86–8° C.

*Analysis.*—Calcd. $C_{18}H_{19}N$: percent C, 86.72; H, 7.68. Found: percent C, 86.89; H, 7.68.

The hydrochloride melted at 289–92°.

*Analysis.*—Calcd. $C_{18}H_{19}N$—HCl: percent C, 75.65; H, 7.06. Found: percent C, 75.63; H, 7.07.

To a stirred solution of 12.5 g. (0.05 mole) 4-benzhydrylidenepiperidine and 5.05 g. (0.05 mole) triethylamine in 100 ml. dry benzene, 4 g. (0.05 mole) acetyl chloride was added dropwise. The temperature was kept below 25° C. with tap water cooling. After addition of the acetyl chloride the mixture was heated to and maintained at 50° C. for 2 hours. The benzene solution was cooled, then washed with water in a separatory funnel. The benzene layer was separated, dried over $MgSO_4$, and the benzene removed by distillation. Crystallization of the residue from alcohol-petroleum ether gave 8.6 gm. of a white product, N-acetyl-4-benzhydrylidenepiperidine, M.P. 114–15° C.

*Analysis.*—Calcd. for $C_{20}H_{21}NO$: C, 82.44; H, 7.26; N, 4.81. Found: C, 82.20; H, 7.15; N, 4.90.

This compound exhibits activity as a depressant for the central nervous system.

EXAMPLE 17

*4-benzhydryl-N-trifluoroacetylpiperidine*

Following the procedure in Example 16, 10 g. (0.04 mole) 4-benzhydrylpiperidine (Sury and Hoffman, Helv. Chem. Acta, 37, 2133, 1954), 4.6 g. (0.045 mole) triethylamine and 9.4 g. (0.045 mole) trifluoroacetic anhydride gave 8 gm. of a white crystalline product, 4-benzhydryl-N-trifluoroacetylpiperidine, M.P. 151–3° C.

*Analysis.*—Calcd. for $C_{20}H_{20}NOF_3$: C, 69.15; H, 5.80; N, 4.03. Found: C, 69.31; H, 6.15; N, 4.14.

This compound exhibits activity as a depressant for the central nervous system.

EXAMPLE 18

*4-benzhydrylidene-N-trifluoroacetylpiperidine*

Following the procedure given in Example 16, 9.4 g. (0.045 mole) trifluoroacetic anhydride, 9.5 g. (0.04 mole) 4-benzhydrylidenepiperidine and 4.6 g. (0.045 mole) triethylamine in 100 ml. dry benzene gave 9.5 g. of a product, 4-benzhydrylidene-N-trifluoroacetylpiperidine, M.P. 88–90° C.

*Analysis.*—Calcd. for $C_{20}H_{18}NOF_3$: C, 69.55; H, 5.25; N, 4.06. Found: C, 70.04; H, 5.29; N, 4.30.

This compound exhibits activity as a depressant for the central nervous system.

EXAMPLE 19

*4-benzhydrylidene-N-carbethoxypiperidine*

Following the procedure given in Example 16, 12.5 g. (0.05 mole) 4-benzhydrylidenepiperidine, 5.5 g. (0.055 mole) ethyl chlorocarbonate and 5.5 g. (0.055 mole) triethylamine in 100 ml. dry benzene gave 5.5 g. of a product, 4-benzhydrylidene-N-carbethoxypiperidine, M.P. 120–2° C.

*Analysis.*—Calcd. for $C_{21}H_{23}O_2N$: C, 78.49; H, 7.21; N, 4.36. Found: C, 78.16; H, 7.10; N, 4.60.

This compound exhibits activity as a depressant for the central nervous system.

EXAMPLE 20

*4-benzhydryl-N-carbethoxypiperidine*

Following the procedure given in Example 16, 10 g. (0.04 mole) 4-benzhydrylpiperidine, 4.9 g. (0.045 mole) ethyl chlorocarbonate and 4.5 g. (0.045 mole) triethylamine in 75 ml. dry benzene gave 5.3 g. of a product, 4-benzhydryl-N-carbethoxypiperidine, M.P. 72–4° C.

*Analysis.*—Calcd. for $C_{21}H_{25}NO_2$: C, 78.00; H, 7.79; N, 4.33. Found: C, 77.65; H, 7.86; N, 4.32.

This compound exhibits activity as a depressant for the central nervous system followed by, after a period of hours, activity as a stimulant for the nervous system.

EXAMPLE 21

*2-benzhydryl-N-carbethoxypiperidine*

To a stirred solution of 32 g. (0.127 mole) of 2-benzhydrylpiperidine (Sury and Hoffman, Helv. Chem. Acta, 37, 2133, 1954) in 150 ml. dry benzene, 6.8 g. (0.063 mole) ethyl chlorocarbonate was added dropwise. Shortly after the end of addition of the chlorocarbonate precipitation occurred. The temperature of the solution reached a maximum of 45° C. Stirring was continued for 3 hours, without external heating. The precipitate was removed by filtration, then the benzene was removed from the filtrate at the water pump. Crystallization of the residue from petroleum ether (B.P. 70–90° C.) gave 17.5 g. of tan product, M.P. 102–5° C. Recrystallization from alcohol and petroleum ether gave 8 g. of a product, 2-benzhydryl-N-carbethoxypiperidine, M.P. 115–17° C.

*Analysis.*—Calcd. for $C_{21}H_{25}NO_2$: C, 78.00; H, 7.79; N, 4.33. Found: C, 78.11; H, 7.64; N, 4.45.

This compound exhibits activity as a depressant for the central nervous system followed by, after a period of hours, activity as a stimulant for the nervous system.

EXAMPLE 22

4-benzhydryl-N-dimethylsulfamylpiperidine

Following the procedure given in Example 16, 10 g. (0.04 mole) 4-benzhydrylpiperidine and 4.5 g. (0.045 mole) triethylamine in 100 ml. dry benzene was added, dropwise, to a stirred solution of 6.4 g. (0.045 mole) dimethylsulfamyl chloride in 50 ml. benzene at 60–70° C. By this means 8.5 g. of a product, 4-benzhydryl-N-dimethylsulfamylpiperidine was obtained, M.P. 107–9° C.

*Analysis.*—Calcd. for $C_{20}H_{26}N_2O_2S$: C, 67.00; H, 7.31; N, 7.82. Found: C, 67.48; H, 7.50; N, 7.44.

This compound exhibits activity as a depressant for the central nervous system.

EXAMPLE 23

4-benzhydrylidene-N-(β-carboxylpropionyl)piperidine

To a solution of 5.5 g. (0.055 mole) succinic anhydride in 100 ml. of 1,2-dimethoxyethane was added, in portions and with stirring, 12.5 g. (0.05 mole) 4-benzhydrylidenepiperidine. The solution was maintained at 60–70° C. for 1 hour, then at room temperature for 1½ hours. It was filtered and the filtrate was concentrated. The residue solidified. It was washed with hot distilled water and collected on a filter. Recrystallization from ethyl acetate-petroleum ether gave 6.5 g. of a product, 4-benzhydrylidene - N - (β - carboxypropionyl)piperidine, M.P. 142–3° C.

*Analysis.*—Calcd. for $C_{22}H_{23}NO_3$: C, 75.64; H, 6.63; N, 4.01. Found: C, 75.79; H, 6.76; N, 4.26.

This compound also forms salts, e.g. the sodium salt which is water soluble.

This compound exhibits activity as a depressant for the central nervous system.

EXAMPLE 24

4-benzhydryl-N-(β-carboxypropionyl)piperidine

Following the procedure given in Example 23, 10 g. (0.04 mole) 4-benzhydrylpiperidine and 4.5 g. (0.045 mole) succinic anhydride in 75 ml. 1,2-dimethoxyethane gave 9 gm. of a product, 4-benzhydryl-N-(β-carboxypropionyl)piperidine, M.P. 165–6° C.

*Analysis.*—Calcd. for $C_{22}H_{25}NO_3$: C, 75.20; H, 7.17; N, 3.99. Found: C, 75.58; H, 7.51; N, 4.13.

This compound also forms salts, e.g. the sodium salt which is water soluble.

This compound exhibits activity as a depressant for the central nervous system.

EXAMPLE 25

4-benzhydrylidene-N-carbamylpiperidine

To a solution of 12.5 g. (0.05 mole) of 4-benzhydrylidenepiperidine in 400 ml. of water containing 6 ml. concentrated hydrochloric acid, at 50° C. was added, over the period of a minute or two, a solution of 5 g. (0.062 mole) of potassium cyanate in 25 ml. of water. Shortly after addition of the cyanate solution the mixture became turbid, then an oil settled out. The oil slowly solidified, and after 4 hours was collected to give 13 g. of product, M.P. 175–8° C. Several recrystallizations from an alcohol-petroleum ether solvent gave 7 g. of purified product, 4-benzhydrylidene-N-carbamylpiperidine which melted at 179–180° C.

*Analysis.*—Calcd. for $C_{19}H_{20}N_2O$: C, 78.03; H, 6.90; N, 9.58. Found: C, 78.27; H, 6.98; N, 9.30.

This compound exhibits activity as a depressant for the central nervous system followed by, after a period of hours, activity as a stimulant for the nervous system.

EXAMPLE 26

4-benzhydryl-N-carbamylpiperidine

Following the procedure given in Example 25, 12 g. (0.0476 mole) 4-benzhydrylpiperidine, 4.85 g. (0.06 mole) potassium cyanate and 6 ml. concentrated hydrochloric acid in 400 ml. of water gave 5.5 g. of product, 4-benzhydryl-N-carbamylpiperidine, M.P. 163–70° C.

*Analysis.*—Calcd. for $C_{19}H_{22}N_2O$: C, 77.51; H, 7.53; N, 9.52. Found: C, 77.61; H, 7.57; N, 8.83.

This compound exhibits activity as a depressant for the central nervous system.

EXAMPLE 27

2-benzhydryl-N-carbamylpiperidine

Following the procedure given in Example 25, 14.3 g. (0.05 mole) 2-benzhydrylpiperidine hydrochloride and 6.5 g. (0.08 mole) potassium cyanate in 400 ml. of water gave 4 g. of product, 2-benzhydryl-N-carbamylpiperidine, M.P. 163–4° C.

*Analysis.*—Calcd. for $C_{19}H_{22}N_2O$: C, 77.51; H, 7.53; N, 9.52. Found: C, 77.36, H, 7.47; N, 9.11.

This compound exhibits activity as a depressant for the central nervous system.

EXAMPLE 28

4-benzhydrylidene-N-ethylcarbamylpiperidine

A solution of 4 g. (0.057 mole) ethyl isocyanate in 20 ml. dry benzene was added, dropwise, to a stirred solution of 12.5 g. (0.05 mole) benzhydrylidenepiperidine in 100 ml. of dry benzene. The temperature of the reaction mixture rose from 24° C. to 45° C. It was then heated to and kept at 50° C. for 1 hour, cooled, and the precipitate collected to give 15 g. of product, M.P. 201–2° C. Recrystallization from an alcohol-petroleum ether mixture gave 13 g. of product, 4-benzhydrylidene-N-ethylcarbamylpiperidine, M.P. 201–3° C.

*Analysis.*—Calcd. for $C_{21}H_{24}N_2O$: C, 78.73; H, 7.55; N, 8.75. Found: C, 78.66; H, 7.44; N, 8.51.

This compound exhibits activity as a depressant for the central nervous system.

EXAMPLE 29

4-benzhydryl-N-ethylcarbamylpiperidine

Following the procedure of Example 28, 10 g. (0.04 mole) 4-benzhydrylpiperidine and 3.2 g. (0.04 mole) ethyl isocyanate in 100 ml. benzene gave 6 g. of product, 4-benzhydryl-N-ethylcarbamylpiperidine, M.P. 173–9° C.

*Analysis.*—Calcd. for $C_{21}H_{26}N_2O$: C, 78.24; H, 8.13; N, 8.69. Found: C, 78.65; H, 8.32; N, 8.58.

This compound exhibits activity as a depressant for the central nervous system.

EXAMPLE 30

4-benzhydrylidene-N-ethylthiocarbamylpiperidine

Following the procedure given in Example 28, 10 g. (0.04 mole) 4-benzhydrylidenepiperidine and 4 g. (0.045 mole) ethyl isothiocyanate in 120 ml. dry benzene gave 10 gm. of product, 4-benzhydrylidene-N-ethylthiocarbamylpiperidine, M.P. 167–9° C.

*Analysis.*—Calcd. for $C_{21}H_{24}N_2S$: C, 74.96; H, 7.19; N, 8.33. Found: C, 75.40; H, 7.27; N, 8.32.

This compound exhibits activity as a depressant for the central nervous system.

EXAMPLE 31

4-benzhydryl-N-ethylthiocarbamylpiperidine

Following the procedure given in Example 28, 10 g. (0.04 mole) 4-benzhydrylpiperidine and 4 g. (0.045 mole) ethyl isothiocyanate in 100 ml. dry benzene gave 8 g. of product, 4 - benzhydryl - N-ethylthiocarbamylpiperidine, M.P. 154–155.5° C.

Analysis.—Calcd. for $C_{21}H_{26}N_2S$: C, 74.51; H, 7.75; N, 8.28. Found: C, 74.78; H, 7.77; N, 8.26.

This compound exhibits activity as a depressant for the central nervous system.

EXAMPLE 32

2-benzhydryl-N-ethylthiocarbamylpiperidine

Following the procedure of Example 28, 17.5 g. (0.07 mole) 2-benzhydrylpiperidine and 6.5 g. (0.075 mole) ethyl isothiocyanate in 100 ml. dry benzene gave 8 g. of product, 2 - benzhydryl - N-ethylthiocarbamylpiperidine, M.P. 152–3° C.

Analysis.—Calcd. for $C_{21}H_{26}N_2S$: C, 74.51; H, 7.75; N, 8.28. Found: C, 74.63; H, 7.74; N, 8.08.

This compound exhibits activity as a depressant for the central nervous system.

EXAMPLE 33

4-benzhydrylidene-N-ethoxyalylpiperidine

A solution of 12.5 g. (0.05 mole) 4-benzhydrylidene-piperidine and 29.2 g. (0.2 mole) diethyl oxalate in 100 ml. benzene was heated under reflux 3 hours, then petroleum ether was added until a cloudiness appeared. The liquid was cooled and filtered to give 16 g. of material, M.P. 160–5° C. Recrystallization from benzene-petroleum ether gave 8.3 g. of product, 4-benzhydrylidene-N-ethoxalylpiperidine, M.P. 168–9° C.

Analysis.—Calcd. for $C_{22}H_{23}NO_3$: C, 75.64; H, 6.63; N, 4.01. Found: C, 75.69; H, 6.66; N, 4.27.

This compound exhibits activity as a depressant for the central nervous system.

The following examples illustrate suitable pharmaceutical compositions containing the new compounds. In these examples, the quantities are given for single units, it being understood that in actual practice, the dosage forms will be prepared in suitable quantities, and the amounts of the materials used adjusted accordingly.

EXAMPLE 34

*25 mg. tablets.*—25 mg. of 4-benzhydryl N-carbethoxypiperidine (Example 20), 48 mg. of powdered sugar, and 32 mg. of corn starch are mixed and granulated with 10% gelatin solution. The granulation is dried and ground to fine granules for tableting. About 1% magnesium stearate is added as a lubricant together with sufficient corn starch to give a weight of 2.5 grains per tablet. The product is compressed on a single punch or rotary machine using a 9/32 inch punch.

EXAMPLE 35

*500 mg. tablets.*—500 mg. of 4-benzhydryl N-carbethoxypiperidine (Example 20) in finely powdered form is admixed with 60 mg. of corn starch and 100 mg. of powdered sugar and then granulated with 10% gelatin solution. The granulation is dried and ground to size suitable for tableting. About 1% magnesium stearate is added as a lubricant, together with sufficient corn starch to give a weight of 700 mg. per tablet. The product is compressed on a single punch or rotary machine using a 7/16 punch.

The tablets of Examples 34 and 35 can be suitably coated if desired, as, for example, with sugar.

EXAMPLE 36

*Capsule.*—25 mg. of 4-benzhydryl N-carbethoxypiperidine (Example 20) is admixed with corn starch in quantity required to provide sufficient bulk for the desired size capsule, and the mixture is encapsulated.

EXAMPLE 37

*Capsule.*—500 mg. of 4-benzhydryl N-carbethoxypiperidine (Example 20) is admixed with sufficient corn starch to give the proper bulk for the desired size capsule, and the mixture is encapsulated.

EXAMPLE 38

*Injectable suspension, 100 mg. per ml.*—The following ingredients are sterilized separately: 100 mg. of 4-benzhydryl-N-carbethoxypiperidine (Example 20), 0.1 mg. of Tween 80 and q.s. corn oil to make a final volume of 1 ml. These ingredients are admixed aseptically. Particle size may be achieved by use of micronized material or by use of a ball mill, maintaining aseptic conditions. The above suspension may be administered subcutaneously and intramuscularly.

EXAMPLE 39

*Oral suspension, 700 mg. per 15 ml.*—150 mg. of Veegum H.V. is hydrated in about 9 ml. of water; 500 mg. of Tween 80, 700 mg. of 4-benzhydryl N-carbethoxypiperidine (Example 20), color and flavor, as desired, and water q.s. 15 ml. are added; the product is mixed well and homogenized.

The other compounds of Examples 1 to 33 can be used in place of the compound of Example 20 in the pharmaceutical preparations of Examples 34 to 39.

We claim:

1. Compounds of the formulae selected from the group consisting of (a)
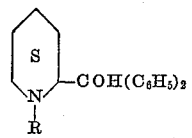

(b)
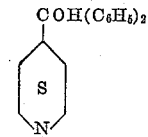

(c)
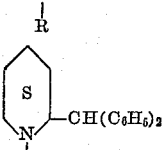

(d)
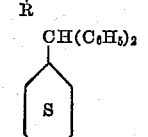

and (e)
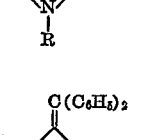

wherein S indicates that the ring is saturated and R is selected from the group consisting of acetyl, trifluoracetyl, chloroacetyl, carbethoxy, carboxypropionyl, ethoxalyl, carbamyl, ethylcarbamyl, ethylthiocarbamyl, dimethylsulfamyl and N-isonicotinoyl.

2. N - dimethylsulfamyl - α,α - diphenyl - 4 - piperidine carbinol.

3. Diphenyl - 4 - (N - ethylthiocarbamyl)piperidine carbinol.

4. Diphenyl - 4 - (N - isonicotinoyl)piperidine carbinol.

5. 4 - benzhydryl - N - carbethoxypiperidine.

6. 4 - benzhydrylidene - N - carbamylpiperidine.

No references cited.